United States Patent
Narula et al.

(10) Patent No.: US 12,170,891 B2
(45) Date of Patent: Dec. 17, 2024

(54) SYSTEMS AND METHODS FOR PROVIDING CONNECTIVITY BETWEEN INFORMATION HANDLING SYSTEMS AND HUMAN INTERFACE DEVICES IN SHARED WORKSPACES

(71) Applicant: Dell Products, L.P., Round Rock, TX (US)

(72) Inventors: Harpreet Narula, Austin, TX (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 298 days.

(21) Appl. No.: 17/661,575

(22) Filed: May 2, 2022

(65) Prior Publication Data

US 2023/0354014 A1  Nov. 2, 2023

(51) Int. Cl.
*H04L 29/06* (2006.01)
*H04L 9/08* (2006.01)
*H04W 12/03* (2021.01)
*H04W 12/50* (2021.01)

(52) U.S. Cl.
CPC ........... *H04W 12/03* (2021.01); *H04L 9/0869* (2013.01); *H04W 12/50* (2021.01); *H04L 2209/80* (2013.01)

(58) Field of Classification Search
CPC ..... H04L 9/3073; H04L 9/22; H04L 63/0492; H04L 9/0822; H04L 9/0847
See application file for complete search history.

(56) References Cited

U.S. PATENT DOCUMENTS

| | | | |
|---|---|---|---|
| 7,860,852 B2 * | 12/2010 | Brunner | G06F 16/951 |
| | | | 707/706 |
| 9,510,201 B1 * | 11/2016 | Shimoon | H04W 12/06 |
| 2014/0369232 A1 * | 12/2014 | Kim | H04W 8/005 |
| | | | 370/254 |
| 2020/0015057 A1 * | 1/2020 | Lo | H04W 4/80 |
| 2021/0226777 A1 * | 7/2021 | Wilson | H04L 9/0861 |
| 2022/0058607 A1 * | 2/2022 | Jones | G06Q 20/20 |

FOREIGN PATENT DOCUMENTS

| | | | | |
|---|---|---|---|---|
| CN | 105916101 A | * | 8/2016 | |
| KR | 20110043160 A | * | 4/2011 | |
| WO | WO-2014016695 A2 | * | 1/2014 | ......... H04L 63/0492 |
| WO | WO-2016164194 A1 | * | 10/2016 | ............. G06F 21/44 |

* cited by examiner

*Primary Examiner* — Shawnchoy Rahman
(74) *Attorney, Agent, or Firm* — Fogarty LLP

(57) ABSTRACT

Embodiments of systems and methods for providing connectivity between Information Handling Systems (IHSs) and Human Interface Devices (HIDs) in shared workspaces are described. In an illustrative, non-limiting embodiment, an IHS may include a processor and a memory coupled to the processor, the memory having program instructions stored thereon that, upon execution by the processor, cause the IHS to: determine that the IHS is located in a shared workspace and, in response to the determination, establish an encrypted wireless communication session with a peripheral device assigned to the shared workspace without a pairing process between the peripheral device and the IHS.

20 Claims, 4 Drawing Sheets

SYSTEMS AND METHODS FOR PROVIDING CONNECTIVITY BETWEEN INFORMATION HANDLING SYSTEMS AND HUMAN INTERFACE DEVICES IN SHARED WORKSPACES

FIELD

This disclosure relates generally to Information Handling Systems (IHSs), and more specifically, to systems and methods for providing connectivity between IHSs and Human Interface Devices (HIDs) in shared workspaces.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Embodiments of systems and methods for providing connectivity between Information Handling Systems (IHSs) and Human Interface Devices (HIDs) in shared workspaces are described. In an illustrative, non-limiting embodiment, an IHS may include: a processor and a memory coupled to the processor, the memory having program instructions stored thereon that, upon execution by the processor, cause the IHS to: determine that the IHS is located in a shared workspace and, in response to the determination, establish an encrypted wireless communication session with a peripheral device assigned to the shared workspace without a pairing process between the peripheral device and the IHS.

For example, the shared workspace may include at least one of: a room, cubicle, or desk in a co-working environment. The peripheral device may include a Human Interface Device (HID) selected from the group consisting of: a keyboard, a pointing device, a touchscreen, a graphics tablet, a joystick, a gamepad, and a webcam.

To determine that the IHS is located in the shared workspace, the program instructions, upon execution, may cause the IHS to identify at least one of: a physical location of the IHS, an identity of wireless Access Point (AP), or a connection to a docking station assigned to the shared workspace. In some cases, the encrypted wireless communication session may take place over a BLUETOOTH connection between the IHS and the peripheral device.

The pairing process may include any pairing process whereby the peripheral device verifies any information received from the IHS. Moreover, the pairing process may include a first authentication stage, a second authentication stage, and a link key calculation.

To establish the encrypted wireless communication session without the pairing process, the program instructions, upon execution, may cause the IHS to: receive a beacon from the peripheral device; generate a pseudo-random number and an encryption key based, at least in part, upon the beacon; transmit the pseudo-random number to the peripheral device; and communicate with the peripheral device during the encrypted wireless communication session using the encryption key.

The beacon may include information indicative of: a device identification (ID), a pseudo-random key, and a device class. The peripheral device may be configured to operate in a non-pairing mode. The peripheral device may be configured to derive the encryption key using the pseudo-random number.

The program instructions, upon execution, may cause the IHS to remove any identification of the IHS from the peripheral device based, at least in part, upon contextual information. The contextual information may include an indication that: the IHS has left or is leaving the shared workspace, the peripheral device has been or is being removed from the shared workspace, or the encrypted wireless communication session has been or is being terminated. The program instructions, upon execution, further cause the IHS to determine that the encrypted wireless communication session is being terminated based, at least in part, upon a calendaring application event.

In another illustrative, non-limiting embodiment, a method may include transmitting a beacon, by a peripheral device of a shared workspace, to an IHS located in the shared workspace; and establishing, by the peripheral device, a BLUETOOTH communication session with the IHS in the absence of a pairing process with the IHS. To transmit the beacon, the peripheral device may operate in a non-pairing mode.

The method may also include receiving a pseudo-random number generated by the IHS based upon the beacon, generating an encryption key using the pseudo-random number; and communicating with the IHS during the BLUETOOTH communication session using the encryption key.

In another illustrative, non-limiting embodiment, a hardware memory device may have program instructions stored thereon that, upon execution by a processor of an IHS, cause the IHS to: receive a beacon from a peripheral device located in a shared workspace; generate a pseudo-random number and an encryption key based, at least in part, upon the beacon; transmit the pseudo-random number to the peripheral device; and communicate with the peripheral device during an encrypted wireless communication session using the encryption key.

The beacon may include information indicative of at least one of: a device identification (ID), a pseudo-random key, or a device class. The program instructions, upon execution, may further cause the IHS to trigger removal of any identification of the IHS from the peripheral device based, at least in part, upon contextual information comprising an indication that: the IHS has left or is leaving the shared workspace, the peripheral device has been or is being removed from the shared workspace, or the encrypted wireless communication session has been or is being terminated.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
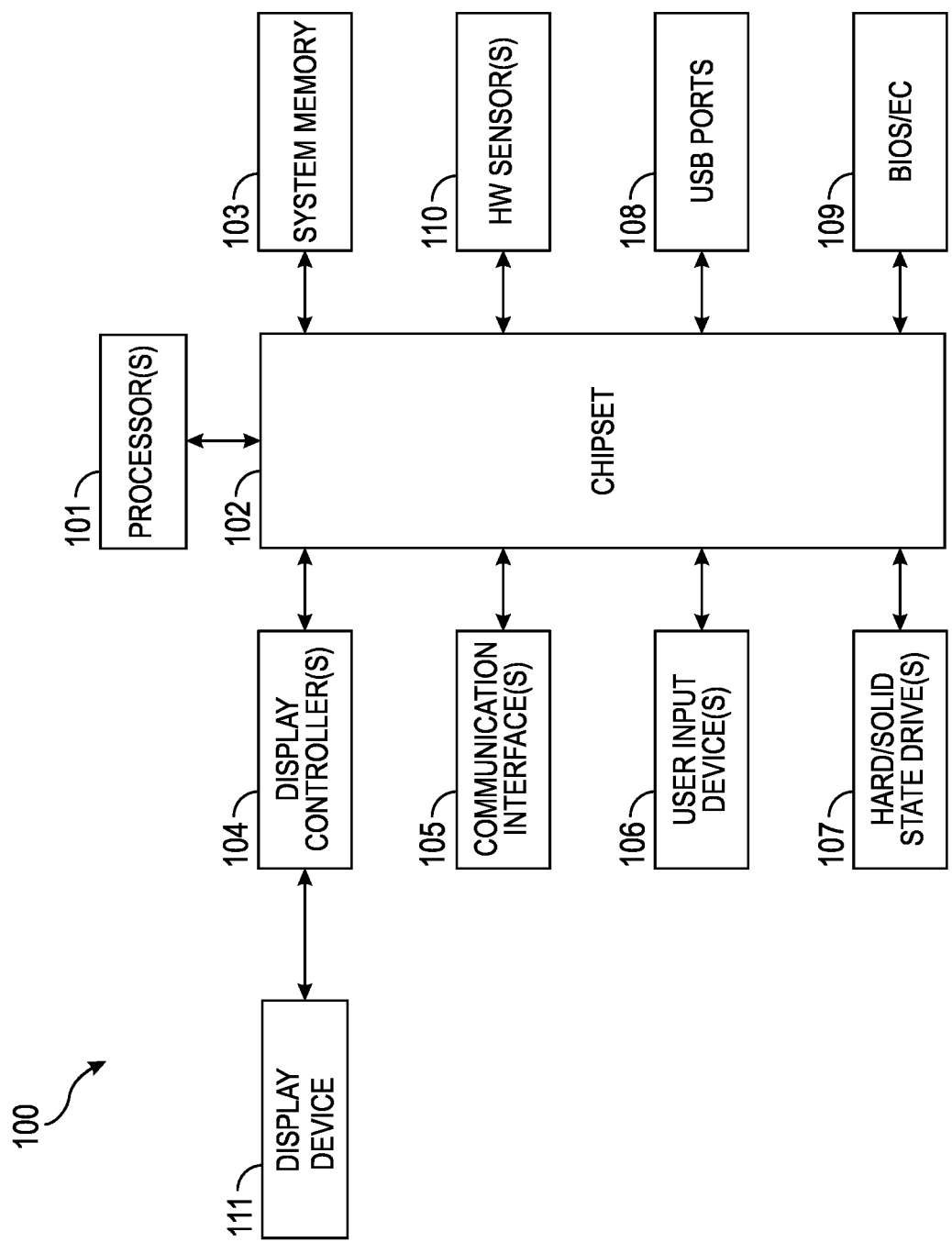
FIG. 1 is a block diagram of components of an example Information Handling System (IHS), according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include random access memory (RAM), one or more processing resources such as a central processing unit (CPU) or hardware or software control logic, ROM, and/or other types of nonvolatile memory. Additional components of an IHS may include one or more disk drives, one or more network ports for communicating with external devices as well as various input and output (I/O) devices, such as a keyboard, a mouse, touchscreen and/or a video display. An IHS may also include one or more buses operable to transmit communications between the various hardware components. A more detailed example of an IHS is described with respect to FIG. 1. It should be appreciated that although certain embodiments are discussed in the context of a personal computing device, other embodiments may utilize other types of IHSs.

As used herein, the term Human Interface Device (HID) refers to any peripheral device usually used by humans that takes input from humans and provides it to an IHS, and/or receives an output from an IHS and provides it to humans. Common examples HIDs include, but are not limited to: mice, keyboards, graphics tablets, image scanners, barcode readers, styluses, cameras, webcams, game pads, memories, monitors, projectors, printers, microphones, headphones, headsets, loudspeakers, etc.

In various implementations, an HID may connect to an IHS using a wireless protocol, such as BLUETOOTH, or the like. BLUETOOTH (BT) is a wireless technology standard used for exchanging data between IHSs and peripheral devices over short distances using short-wavelength, ultra-high frequency (UHF) radio waves in the industrial, scientific, and medical radio bands, from 2.400 to 2.485 GHz, and for building personal area networks (PANs).

In some scenarios, when a customer purchases an HID, the factory or manufacturer of the HID may pre-pair the HID to a dongle (e.g., a wireless communications adapter) supplied therewith. A dongle is a small piece of hardware device that plugs into a port of the IHS (e.g., a Universal Serial Bus or "USB" port) and allows an HID to connect to the IHS via a Radio Frequency (RF) connection or via a wireless protocol. Because the HIDs are already paired to the dongle prior to being shipped from the factory, there is no need for the customer to perform additional pairing processes. In other scenarios, when a customer purchases a BT HID along with an IHS, the factory, manufacturer, warehouse, and/or seller of the IHS may pre-pair the HID to the IHS prior to shipping them to the customer. In most other scenarios, however, when the customer purchases an aftermarket BT HID, they are required to manually pair the HID with their IHS using a so-called "pairing process."

For security purposes, communications between an IHS and a BT HID generally require either encryption and/or authentication. An HID may be paired to an IHS by creating a "shared secret" known as a link key (LTK). When both the IHS and the HID store the same link key, they are said to be "paired" or "bonded."

An IHS intended to communicate with a bonded BT HID can cryptographically authenticate the identity of the HID, ensuring it is the same HID it has been previously paired with. Once an LTK is generated, an authenticated Asynchronous Connection-Less (ACL) link between the IHS and the HID may be encrypted to protect exchanged data against eavesdropping. Typically, users can manually delete link keys from either the IHS or the HID, which removes the bond between them.

In modern enterprises, the term "hoteling" (or "office hoteling"), shared workspaces, or co-working offices collectively refer to physical environments where clients, users, or employees can schedule their hourly, daily, or weekly use of individual workspaces, such as office desks, cubicles, or conference rooms—thus serving as an alternative to permanently assigned seating. Generally, hoteling clients, users, or employees access a reservation system to book a workspace before they arrive at work, which gives them freedom and flexibility to work where they want to. In some cases, individual workspaces may also be available to users without a reservation system on a first-come, first-serve basis (e.g., in the lobby of a hotel).

Each individual workspace in a shared workspace may include its own set of BT HIDs. When a client, user, or employee reaches an individual workspace, they can bring their own IHS and use the HIDs assigned to that workspace with their IHS during a work session. In some implementations, each individual workspace may also include a docking station to which the IHS may be coupled during at least a portion of the session.

Whenever a given workspace is used, clients, users, and employees typically spend a significant amount of time pairing BT HIDs found in that workspace to their IHSs. For example, if a headset is provided as part of an individual workspace that is new to a client, the headset is also a new device with respect to the client's IHS, and the client must ordinarily manually configure/pair the workspace's headset to their IHS. In some cases, clients manually pair each HID to a given IHS by going through one or more time-consuming Q&A challenges (e.g., entering pins or codes, multi-factor authentication, etc.).

That is because conventional BT pairing processes tend to focus on improving out-of-box experience (OOBE), and therefore BT HIDs are automatically placed in pairing mode when powered-on for the first time. Any subsequent pairing generally requires non-standard processes, such as dutycycle managed multi-function buttons (e.g., long press of a button), gestures, etc. Conventional BT pairing is even more cumbersome in shared workspaces that have different HIDs from different vendors, across multiple generations, types, and stock keeping units (SKUs).

Additionally, BT HIDs use RAM-based memory blocks which is expensive, and number of BT pairing key slots is limited to only a few. Storing a pairing key may also result in unintentional connectivity as the same user may be booked into a nearby workspace on a subsequent day, in which case the user's IHS may inadvertently connect to a previously paired BT HID, should the pairing information persist indefinitely.

Accordingly, while the use of conventional BT pairing processes is acceptable in several applications, the inventors hereof have recognized that shared workspace users would benefit from having their IHSs connect with multiple BT HIDs in each individual workspace in a faster and less intrusive manner. Moreover, in shared workspaces, it would be beneficial for BT connections to persist only during the user's session.

To address these, and other issues, systems and methods described herein provide mechanisms to securely connect an IHS to BT HIDs in shared workspaces while improving the user's experience by providing fast, reliable, and transactional or session-only connection persistence. In various implementations, these systems and methods may provide quick and non-persistent BT connections between an IHS and one or more HIDs using continuous or periodic Turbo Connect beacons transmitted by the HIDs and received by the IHS over standard or non-standard advertising channels, only for the duration of a session.

Moreover, systems and methods described herein may enable "0-click" BT connectivity with an intended HID, among a plurality of other HIDs, while avoiding connecting to other HIDs, for example, in a crowded shared workplace. As such, these systems and methods may provide a "just connect" solution for BT HIDs in shared workspaces without requiring the user to go through much more burdensome, conventional pairing processes.

FIG. 1 is a block diagram of components of IHS 100, according to some embodiments. As depicted, IHS 100 includes processor 101. In various embodiments, IHS 100 may be a single-processor system, or a multi-processor system including two or more processors. Processor 101 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 102 coupled to processor 101. Chipset 102 may provide processor 101 with access to several resources. In some cases, chipset 102 may utilize a QuickPath Interconnect (QPI) bus to communicate with processor 101. Chipset 102 may also be coupled to communication interface(s) 105 to enable communications between IHS 100 and various wired and/or wireless networks, such as Ethernet, WiFi, BLUETOOTH, cellular or mobile networks (e.g., CDMA, TDMA, LTE, etc.), satellite networks, or the like. In some cases, communication interface(s) 105 may be coupled to chipset 102 via a PCIe bus.

Chipset 102 may be coupled to display controller(s) 104, which may include one or more graphics processor(s) (GPUs) on a graphics bus, such as an Accelerated Graphics Port (AGP) or Peripheral Component Interconnect Express (PCIe) bus. As shown, display controller(s) 104 provide video or display signals to display device 111. In other implementations, any number of display controllers or display devices may be used.

Display device 111 may include Liquid Crystal Display (LCD), Light Emitting Diode (LED), organic LED (OLED), or other thin film display technologies. Display device 111 may include a plurality of pixels arranged in a matrix, configured to display visual information, such as text, two-dimensional images, video, three-dimensional images, etc. In some cases, display device 111 may be provided as a single continuous display, rather than two discrete displays.

Chipset 102 may provide processor 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like. Memory 103 may store program instructions that, upon execution by processor 101, enable a collaboration mode for a touchpad coupled or integrated into IHS 100.

Chipset 102 may also provide access to one or more hard disk and/or solid-state drives 107. In certain embodiments, chipset 102 may also provide access to one or more optical drives or other removable-media drives. In certain embodiments, chipset 102 may also provide access to one or more Universal Serial Bus (USB) ports 108.

Chipset 102 may further provide access to one or more user input devices 106, for example, using a super I/O controller or the like. Examples of user input devices 106 include, but are not limited to, a keyboard, mouse, touchpad, stylus or active pen, totem, etc. Each of user input devices 106 may include a respective controller (e.g., a touchpad may have its own touchpad controller) that interfaces with chipset 102 through a wired or wireless connection (e.g., via communication interfaces(s) 105).

In certain embodiments, chipset 102 may also provide an interface for communications with one or more hardware (HW) sensors 110. Sensors 110 may be disposed on or within the chassis of IHS 100, and may include, but are not limited to: electric, magnetic, radio, optical, infrared, thermal, force, pressure, acoustic, ultrasonic, proximity, position, deformation, bending, direction, movement, velocity, rotation, and/or acceleration sensor(s).

Upon booting of IHS 100, processor(s) 101 may utilize Basic Input/Output System (BIOS) instructions of BIOS/Embedded Controller (EC) 109 to initialize and test hardware components coupled to IHS 100 and to load an OS for use by IHS 100. The BIOS provides an abstraction layer that allows the OS to interface with certain hardware components that are utilized by IHS 100. Via the hardware abstraction layer provided by the BIOS, software stored in system memory 103 and executed by processor 101 can interface with certain I/O devices that are coupled to IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

EC 109 may be installed as a Trusted Execution Environment (TEE) component to the motherboard of IHS 100. EC 109 may implement operations for interfacing with a power adapter in managing power for IHS 100. Such operations may be utilized to determine the power status of IHS 100, such as whether IHS 100 is operating from battery power or is plugged into an AC power source. Firmware instructions utilized by EC 109 may be used to provide various core operations of IHS 100, such as power management and management of certain modes of IHS 100 (e.g., turbo modes, maximum operating clock frequencies of certain components, etc.).

In some implementations, a low-power mode of operation may include the S0 low-power idle model, also known as Modern Standby or Connected Standby, which provides an instant on/off user experience and maintains a network connection for certain processes while consuming very little power. These power modes may be entered, for example, when IHS 100 transitions into standby (e.g., "sleep," etc.).

EC 109 may also implement operations for detecting certain changes to the physical configuration or posture of IHS 100 and managing the modes of a touchpad or other user input device 106 in different configurations of IHS 100. For instance, where IHS 100 as a 2-in-1 laptop/tablet form factor, EC 109 may receive inputs from a lid position or hinge angle sensor 110, and it may use those inputs to determine: whether the two sides of IHS 100 have been latched together to a closed position or a tablet position, the magnitude of a hinge or lid angle, etc.

EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component. Such hash values may be calculated as part of a trusted process of manufacturing IHS 100 and may be maintained in secure storage as a reference signature. EC 109 may later recalculate the hash value for a component may compare it against the reference hash value to determine if any modifications have been made to the component, thus indicating that the component has been compromised. In this manner, EC 109 may validate the integrity of hardware and software components installed on IHS 100.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, all or a portion of the operations executed by the illustrated components may instead be provided by components integrated into processor(s) 101 as systems-on-a-chip (SoC). As such, in certain embodiments, IHS 100 may be implemented as different classes of computing devices including, but not limited to: servers, workstations, desktops, laptops, appliances, video game consoles, tablets, smartphones, etc.

Figure 2:
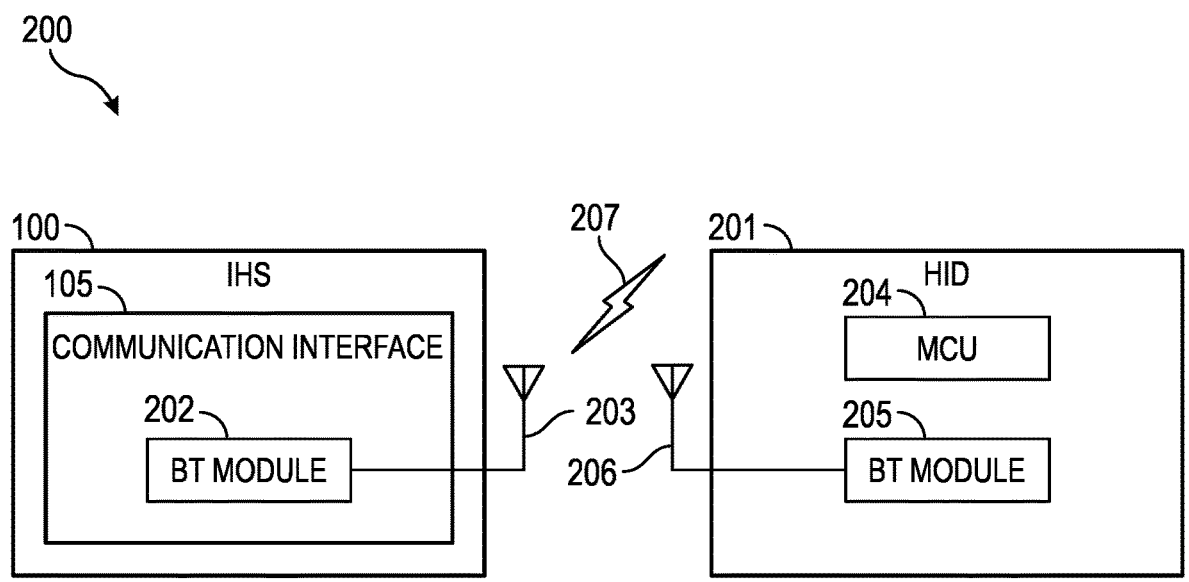
FIG. 2 is a block diagram of an example of a system for providing connectivity between IHSs and Human Interface Devices (HIDs) in shared workspaces, according to some embodiments.

FIG. 2 is a block diagram of an example of system 200 for providing connectivity between IHSs and HIDs in shared workspaces. In various embodiments, one or more elements of system 200 may be implemented by one or more components of IHS 100 or HID 201, and/or may be instantiated through the execution of program instructions (e.g., applications, OS services, firmware, etc.) by processor(s) 101 or microcontroller unit (MCU) 204.

Particularly, IHS 100 is shown with communication interface 105, BT module 202, and RF antenna 203. Meanwhile, HID 201 includes MCU 204, BT module 205, and RF antenna 206. In various implementations, IHS 100 and HID 201 may be concurrently disposed in an individual workspace part of a larger, shared workspace. For example, HID 201 may be a BT peripheral device assigned to a particular office, cubicle, or desk (among a plurality of other offices, cubicles, or desks), and IHS 100 may be temporarily located at that same individual workspace during the user's session (e.g., during a scheduled day or time).

Each of BT modules 202 and 205 may be configured to send and receive signals to and from one another through respective RF antennas 203 and 206. In operation, BT modules 202 and 205 may each implement a BT stack that configures it to establish BT connection 207. Furthermore, connection 207 may be established using a BT protocol that has been modified for operation in the shared workspace using Turbo Connect method 300 of FIG. 3B.

For example, in response to a determination that IHS 100 is in a shared workspace, IHS 100 may execute an application, OS service, or firmware that enables it to assume the role of master device and implement operations 333, 335, 337, 338, 339, 340, 342, 344, and 346 of Turbo Connect method 300 using BT module 202. Conversely, MCU 204 of HID 201 may be configured to execute firmware that enables it to assume to role of a slave device and implement operations 334, 336, 337, 341, 343, 345, and 346 of Turbo Connect method 300 using BT module 205.

HID 201 may broadcast low-power beacons with vendor-defined advertising packets ("Turbo Connect beacons") to indicate that HID 201 is configured for Turbo Connect setup. Turbo Connect beacons may include, for example, the HID's device identification (ID), a pseudo-random key, and the HID's device class (e.g., a keyboard class, a mouse class, etc.). Moreover, Turbo Connect beacons may be configured at low transmission (Tx) power depending upon the size and density of the shared workspace, as they only need to be detectable within a unit (e.g., office, cubicle, or desk) of the shared workspace.

Configuring HID 201 to implement systems and methods described herein may involve provisioning HID 201 at its factory or Point-of-Sale (POS) to beacon itself as a Turbo Connect device capable of using Turbo Connect method 300. Additionally, or alternatively, HID 201 may be configured over a Generic ATTribute (GATT) interface or the like after a first conventional pairing process 301 of FIG. 3B (e.g., by an IT administrator provisioning and configuring a workspace for shared used in a co-working space, hotel lobby, etc.) to thereafter implement Turbo Connect method 300.

Meanwhile, IHS 100 may be configured to execute a peripheral device discovery service for HIDs advertising themselves in Turbo Connect mode. The IHS's discovery service may discover Turbo Connect beacons from HID 201 (and other HIDs) present in the shared workspace.

IHS 100 may use the information from HID's Turbo Connect beacons to start a Turbo Connect session in the absence of a conventional pairing between HID 201 and IHS 100. For example, upon detecting a Turbo Connect beacon, IHS 100 may display detected device information (e.g., device ID, device class, etc.) in a Graphical User Interface (GUI). In some cases, an image of the discovered HID 201 may be displayed to the user, but no click or command may be required.

IHS 100 may send a connection request to HID 201 in response to having received its Turbo Connect beacon, and it may wait for a connection response from HID 201. In some cases, the connection response may not be generated or transmitted by HID 201 until some form of user activity is detected on HID 201 to confirm the user's intent to connect IHS 100 to HID 201 during the shared workspace session.

In some cases, the same user activity may also be used to wake HID 201 from its low-power, Turbo Connect beacon-only mode of operation. For example, user activities usable to infer the user's intent to connect a mouse to IHS 100 and/or to wake up the mouse in Turbo Connect mode may include, but are not limited to: moving the mouse in any direction, moving the mouse in a predetermined direction (to the exclusion of another direction(s)), clicking a mouse button or switch (to the exclusion of another button(s) or switch(es)), or shaking the mouse. As another example, user activities usable to infer the user's intent to connect a keyboard to IHS 100 and/or to wake up the keyboard in Turbo Connect mode may include, but are not limited to: pressing any key on the keyboard, pressing a predetermined key (e.g., of a selected keyboard row or group of keys) or activating a button or switch (to the exclusion of another key(s), button(s), or switch(es)), or moving the keyboard.

The HID's connection response may once again include device information to confirm that the intended target peripheral device is the one (among others) responding to the IHS's connection request. In some cases, the IHS 100 may also suggest or require that the user employ a selected action for waking up HID 201 based upon the detected information, for example, to further reduce power consumption of HID 201 while in beacon mode or for security reasons. Because conventional BT pairing processes are avoided, connection 207 between IHS 100 and HID 200 may be established much faster (less than 1 second in most cases).

With respect to session management, the duration of a given Turbo Connect session between IHS 100 and HID 201 may be configured after the pairless connection process is completed and the shared workspace session has already begun. During a shared workspace session, IHS 100 and HID 201 may utilize a session key for encryption. The session key may be derived by each entity based on a common algorithm and/or seed. In some cases, session key information may be retained only for the session duration, although IHS 100 need not stay connected to HID 201 for the entire direction of the shared workspace session.

For example, IHS 100 may leave a shared workspace unit to attend a meeting in a collaboration room, and then return to the original workspace during the same session (e.g., while the original workspace is reserved to them). In that case, HID 201 may connect to IHS 100 immediately and use the same session key, without beaconing (during the shared workspace session, HID 201 may refrain from transmitting Turbo Connect beacons), while IHS 100 is absent. This may be achieved, for example, by sending disconnect required command (e.g., as part of a Generic Access Profile or "GAP" procedure) from IHS 100 to HID 201 only at the end of a configured or scheduled shared workspace session.

In some cases, the disconnect required command may trigger the deletion of any identification of IHS 100 from HID 201, as well as the session key. The disconnect command may be transmitted by IHS 100 at least in part, based upon contextual information. Such contextual information may include, for example, an indication that IHS 100 has left or is leaving the shared workspace, that HID 201 has been or is being removed from the shared workspace, or that the encrypted wireless communication session has been or is being terminated.

IHS 100 may determine that the encrypted wireless communication session is being terminated based, at least in part, upon a schedule event in calendaring application. In cases where IHS 100 abruptly leaves the shared workspace without sending the disconnect required command, HID 201 may be configured to automatically disconnect and delete all IHS identification, as well as the session key, after a predetermined idle or waiting period.

Figure 3A:
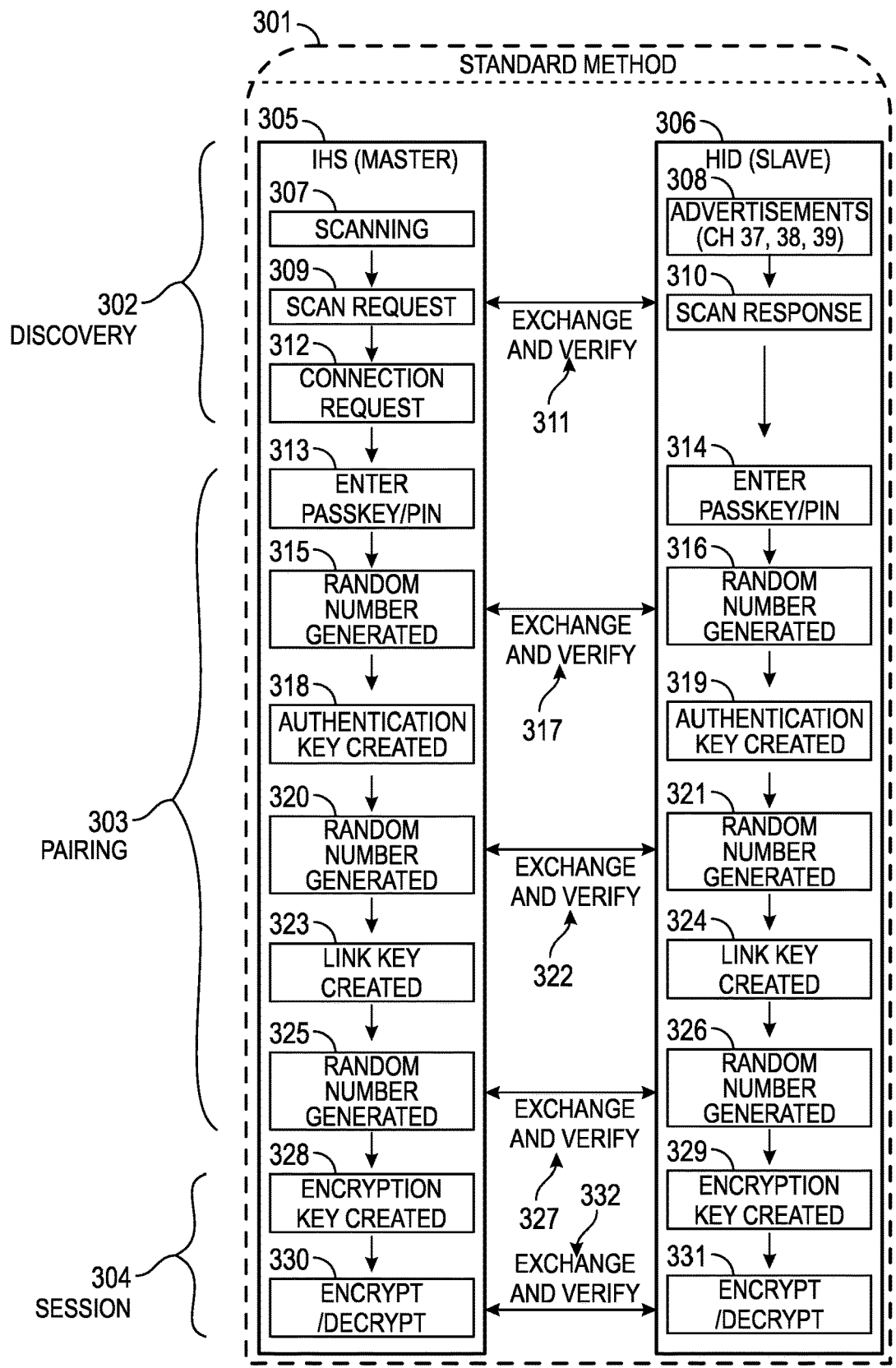
FIG. 3A is a flowchart of an example of a standard method for providing connectivity between an IHS and an HID using a conventional pairing process ("Prior Art").

FIG. 3A is a flowchart of an example of standard method 301 for providing connectivity between IHS 305 (master) and HID 306 (slave) using a conventional pairing process ("Prior Art") such as, for example, a conventional pairing process that follows a BLUETOOTH industry standard. Method 301 takes place in three phases: discovery 302, pairing 303, and session 304.

During discovery phase 302, at 307 IHS 305 scans for conventional BT beacons while at 308 HID 306 broadcasts conventional BT beacons over standard advertising channels 37, 38, and/or 39. At 309, after receiving a conventional BT beacon from HID 306, IHS 305 sends a scan request to HID 306. At 310, HID 210 sends a scan response to IHS 305, and at 311 IHS 305 and HID 306 exchange and verify each other's information. If the verification is successful, at 312 IHS 305 generates a connection request.

During conventional pairing 303 of standard method 301, IHS 305 and HID 306 perform a public key exchange by generating its own Elliptic Curve Diffie-Hellman (ECDH) public-private key pair. In a first authentication stage, a protocol option is chosen by the connecting devices based on their I/O capabilities (e.g., numeric comparison, out-of-band, or passkey entry). In a second authentication stage, each device confirms that both devices have successfully completed the exchange as stipulated by which protocol was chosen and used during the first authentication stage. Then, a link key calculation is performed such that each device confirms that both devices have successfully completed the exchange as stipulated by which protocol was chose and used in the second authentication stage.

During paring phase 303, at 313 IHS 305 receives a passkey or pin from a user and, at 315, it generates a first random number. Additionally, or alternatively, at 314 HID 306 receives a passkey or pin from the user and, at 315, it generates another first random number. At 317, IHS 305 and HID 306 exchange and verify each other's information. If this authentication stage is successful, at 318 IHS 305 creates a first authentication key based on the first random number, and at 319 HID 306 creates another first authentication key based on the other first random number. At 320, IHS 305 generates a second random number, and at 321 HID 306 generates another second random number. At 322, IHS 305 and HID 306 exchange and verify each other's information. If this other authentication stage is successful, at 323, IHS 305 creates a link key based on the second random number, and at 324 HID creates another link key based on the other second random number. At 325, IHS 305 generates a third random number and at 326 HID 306 generates another third random number. At 327, IHS 305 and HID 306 exchange and verify each other's information. If this link key calculation stage is successful, pairing is deemed complete.

During session phase 304, Link Management Protocol (LMP) authentication and encryption are used so that encryption keys are generated and shared, such that IHS 305 and HID 306 successfully connected. Particularly, in the beginning of session phase 304, at 328 IHS 305 creates an encryption key, and at 329 HID 306 creates another encryption key. At 330, IHS 305 encrypts outgoing messages and decrypts incoming messages using the encryption key, at 331 HID 306 encrypts outgoing messages and decrypts incoming messages using the other encryption key, and at 332 IHS 305 and HID 306 exchange and verify each other's information.

In standard method 301, after pairing phase 303 is performed once, IHS 305 and HID 306 persistently store information about each other sufficient for subsequent connections or session, unless and/or until that information is manually deleted later on (e.g., IHS information is removed from HID 306 or vice versa).

Figure 3B:
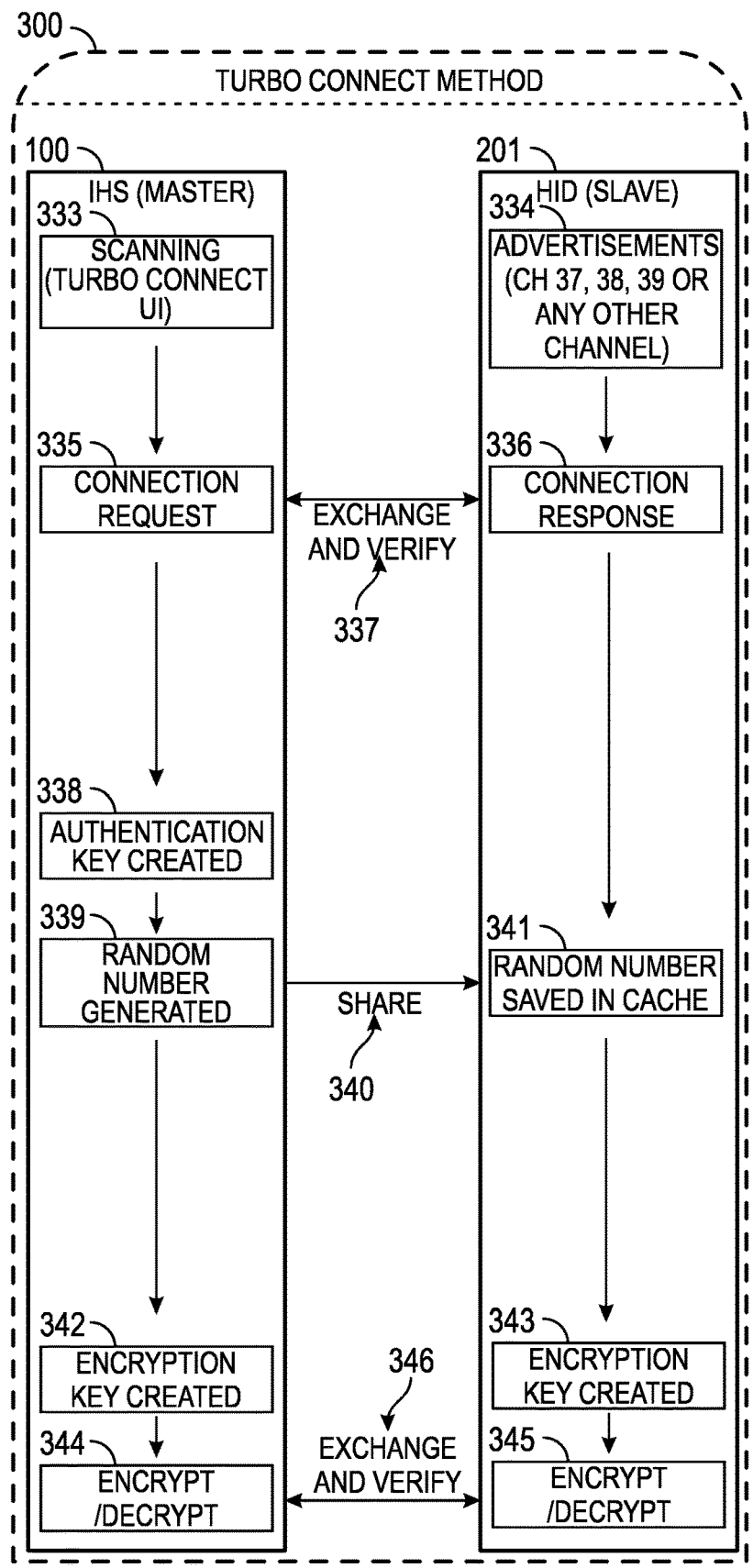
FIG. 3B is a flowchart of an example of a method for providing session-persistent connectivity between IHSs and HIDs in shared workspaces, according to some embodiments.

In contrast with standard method 301, FIG. 3B shows a flowchart of an example of Turbo Connect method 300 for providing session-persistent connectivity only between IHS 100 (master) and HID 201 (slave) in shared workspaces using systems and methods described herein. In some cases, method 301 may be performed in response to a determination that IHS 100 is located in an individual workspace part of a shared workspace, for example, by identifying a physical location of IHS 100 (e.g., using a Global Position System or the like), an identity of wireless Access Point (AP), router, or switch serving the individual workplace, or a connection to a docking station assigned to the individual workspace. In that scenario, HID 201 may be configured to operate in non-pairing or Turbo Connect mode.

Particularly, at 333 IHS 100 scans for Turbo Connect beacons while at 334 HID 201 broadcasts Turbo Connect beacons over standard advertising channels 37, 38, and/or 39, or any other selected channel. At 335, IHS 100 sends a connection request to HID 201 using information gather from the Turbo Connect beacons, at 336 HID 201 sends a connection response to IHS 100, and at 337 IHS 100 and HID 201 exchange and verify each other's information. Thus, in comparison with standard method 300, Turbo Connect method 301 does not involve scan requests and responses.

At 338, IHS 100 creates a first authentication key and at 339 it generates a pseudo-random number. At 340 IHS shares the pseudo-random number with HID 201, and at 341 HID 201 saves the random number in a cache memory. Thus, in comparison with standard method 300, Turbo Connect method 301 does not involve pairing phase 303.

At 342, IHS 100 creates an encryption key based on the pseudo-random number, and at 343 HID 201 independently re-creates the encryption key based on the pseudo-random number. At 344, IHS 100 encrypts outgoing messages and decrypts incoming messages using the encryption key, at 345 HID 201 encrypts outgoing messages and decrypts incoming messages using the other encryption key, and at 346 IHS 100 and HID 201 exchange and verify each other's information. As such, an encrypted wireless communication session takes place over a BT connection between IHS 100 and HID 201 without conventional pairing—that is, HID 201 does not verify any information received by IHS 100 (at least prior to the generation of encryption keys used during the session).

Moreover, with Turbo Connect method 300, IHS 100 and HID 201 do not persistently store information about each other outside of a session. Instead, method 300 may be repeated each time a connection between IHS 100 and HID 201 is desired.

In Turbo Connect method 300, advertising modes for HIDs can be configured to use additional channels which can also be used by a Turbo Connect scanner. One or more authentication stages may be obviated by the receipt of an HID's device ID contained in Turbo Connect beacons, and therefore does not need to be performed. Moreover, link key calculation and sharing are also not required (as pairing is not required) for temporary connection. Instead, a secure session key is generated based on the HID's device ID and advertising packet information contained in the Turbo Connect beacon. Accordingly, Turbo Connect method 300 enables instantaneous connectivity without the need for a conventional pairing phase, while maintaining security for each shared workspace session.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, IoT devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a processor; and
a memory coupled to the processor, the memory having program instructions stored thereon that, upon execution, cause the IHS to:
determine that the IHS is located in a shared workspace;
in response to the determination, establish an encrypted wireless communication session with a peripheral device assigned to the shared workspace without a pairing process between the peripheral device and the IHS; and
remove an identification of the IHS from the peripheral device based, at least in part, upon contextual information.

2. The IHS of claim 1, wherein the shared workspace comprises at least one of: a room, cubicle, or desk in a co-working environment.

3. The IHS of claim 1, wherein the peripheral device comprises a Human Interface Device (HID) selected from the group consisting of: a keyboard, a pointing device, a touchscreen, a graphics tablet, a joystick, a gamepad, and a webcam.

4. The IHS of claim 1, wherein to determine that the IHS is located in the shared workspace, the program instructions, upon execution, further cause the IHS to identify at least one of: a physical location of the IHS, an identity of wireless Access Point (AP), or a connection to a docking station assigned to the shared workspace.

5. The IHS of claim 1, wherein the encrypted wireless communication session takes place over a BLUETOOTH connection between the IHS and the peripheral device.

6. The IHS of claim 1, wherein the pairing process comprises any pairing process whereby the peripheral device verifies any information received from the IHS.

7. The IHS of claim 6, wherein the pairing process comprises a first authentication stage, a second authentication stage, and a link key calculation.

8. The IHS of claim 6, wherein to establish the encrypted wireless communication session without the pairing process, the program instructions, upon execution, further cause the IHS to:
receive a beacon from the peripheral device;
generate a pseudo-random number and an encryption key based, at least in part, upon the beacon;
transmit the pseudo-random number to the peripheral device; and
communicate with the peripheral device during the encrypted wireless communication session using the encryption key.

9. The IHS of claim 8, wherein the beacon comprises information indicative of: a device identification (ID), a pseudo-random key, and a device class.

10. The IHS of claim 8, wherein the peripheral device is configured to operate in a non-pairing mode.

11. The IHS of claim 8, wherein the peripheral device is configured to derive the encryption key using the pseudo-random number.

12. The IHS of claim 1, wherein the contextual information comprises an indication that: the IHS has left or is leaving the shared workspace, the peripheral device has been or is being removed from the shared workspace, or the encrypted wireless communication session has been or is being terminated.

13. The IHS of claim 12, wherein the program instructions, upon execution, further cause the IHS to determine that the encrypted wireless communication session is being terminated based, at least in part, upon a calendaring application event.

14. A method, comprising:
transmitting a beacon, by a peripheral device of a shared workspace, to an Information Handling System (IHS) located in the shared workspace;
establishing, by the peripheral device, a BLUETOOTH communication session with the IHS in the absence of a pairing process with the IHS; and
removing an identification of the IHS from the peripheral device based, at least in part, upon contextual information.

15. The method of claim 14, wherein to transmit the beacon, the peripheral device is operating in a non-pairing mode.

16. The method of claim 14, further comprising:
receiving a pseudo-random number generated by the IHS based upon the beacon;
generating an encryption key using the pseudo-random number; and
communicating with the IHS during the BLUETOOTH communication session using the encryption key.

17. A hardware memory device having program instructions stored thereon that, upon execution by a processor of an Information Handling System (IHS), cause the IHS to:
receive a beacon from a peripheral device located in a shared workspace;
generate a pseudo-random number and an encryption key based, at least in part, upon the beacon;

transmit the pseudo-random number to the peripheral device; communicate with the peripheral device during an encrypted wireless communication session using the encryption key; and trigger removal of an identification of the IHS from the peripheral device based, at least in part, upon contextual information.

18. The hardware memory device of claim 17, wherein the beacon comprises information indicative of at least one of: a device identification (ID), a pseudo-random key, or a device class.

19. The hardware memory device of claim 17, wherein the contextual information comprises an indication that: the IHS has left or is leaving the shared workspace, the peripheral device has been or is being removed from the shared workspace, or the encrypted wireless communication session has been or is being terminated.

20. The method of claim 14, wherein the contextual information comprises an indication that: the IHS has left or is leaving the shared workspace, the peripheral device has been or is being removed from the shared workspace, or the encrypted wireless communication session has been or is being terminated.

* * * * *